United States Patent [19]
Mizutani et al.

[11] Patent Number: 5,216,628
[45] Date of Patent: Jun. 1, 1993

[54] ABSOLUTE VALUE ARITHMETIC CIRCUIT

[75] Inventors: Hideo Mizutani; Noritsugu Matsubishi; Yoshio Tokuno, all of Tokyo, Japan

[73] Assignee: Oki Electric Industry Co., Ltd., Tokyo, Japan

[21] Appl. No.: 732,818

[22] Filed: Jul. 19, 1991

[30] Foreign Application Priority Data

Jul. 23, 1990 [JP] Japan .................. 2-194665

[51] Int. Cl.$^5$ .................................. G06F 7/38
[52] U.S. Cl. .................... 364/715.01; 364/715.10
[58] Field of Search ............... 364/715.01, 715.10, 364/715.04, 748, 769

[56] References Cited

U.S. PATENT DOCUMENTS

| | | | |
|---|---|---|---|
| 4,218,751 | 8/1980 | McManigal | 364/784 |
| 4,761,759 | 8/1988 | Nakagawa | 364/769 |
| 4,924,421 | 5/1990 | Seguchi | 364/715.10 |
| 5,027,308 | 6/1991 | Sit et al. | 365/715.04 |
| 5,040,136 | 8/1991 | Kanoh | 364/715.10 |
| 5,075,879 | 12/1991 | Anderson | 364/715.01 |

Primary Examiner—Long T. Nguyen
Attorney, Agent, or Firm—Edward D. Manzo; John J. King

[57] ABSTRACT

An absolute value arithmetic circuit for computing the absolute value of two binary input signals, includes: a computing circuit for obtaining a difference between the two input signals, a 1's complementor for non-inverting or inverting an output from the computing circuit in accordance with a positive sign bit or a negative sign bit of the output, a priority encoder for searching an output from the 1's complementor for the position of a first "0" bit from the least significant digit of the output and delivering an encoder output indicating the position of the first "0" bit, and a bit inverting circuit for inverting and delivering a bit row from the least significant digit bit to the "0" bit in the output from the 1's complementor in accordance with the encoder output, and directly delivering a bit row from a bit higher than the "0" bit to the most significant digit bit of the output without inverting them.

5 Claims, 3 Drawing Sheets

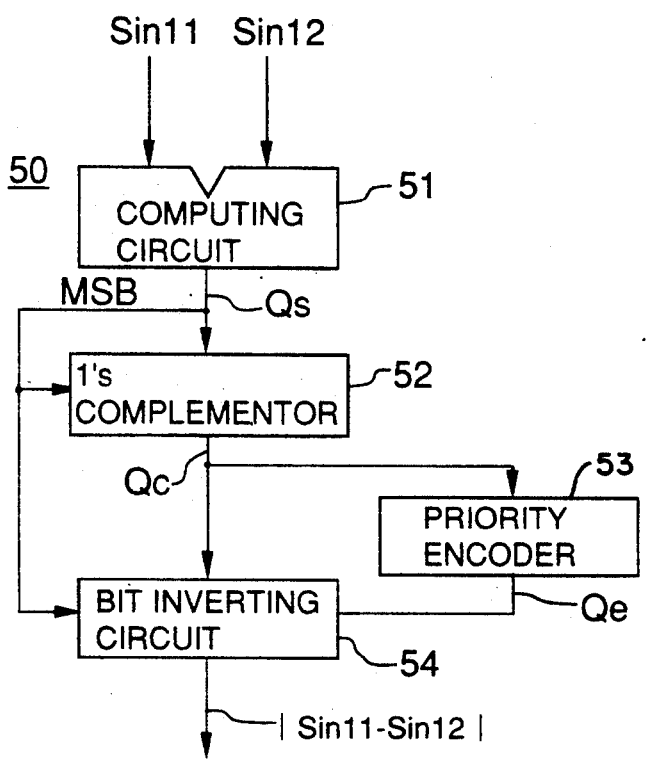
F I G .1

ABSOLUTE VALUE ARITHMETIC CIRCUIT

REFERENCE TO RELATED APPLICATIONS

This invention claims the right of priority under 35 U.S.C. 119 of Japanese Patent Application Serial No. 02-194665, filed on Jul. 23, 1990.

BACKGROUND OF THE INVENTION

1. Field of the Invention

The present invention relates to an absolute value arithmetic circuit for computing the absolute value of a difference between two digital numeral values in a digital signal processor (DSP), a microprocessor, a microcomputer or the like.

2. Description of the Related Art

Heretofore, technology in the above-mentioned field is disclosed in the "Study of Absolute Value Computing System" issued at the 1986th national conference of the communication branch of the Institute of Electronics Communication Engineers, 1-46. The arrangement disclosed in this literature will be explained below.

FIGS. 2a to 2d are circuit block diagrams illustrating conventional absolute value arithmetic circuits. FIG. 2a shows a parallel-type circuit, FIG. 2b shows a series-type circuit, FIG. 2c shows an input register type circuit, and FIG. 2d shows an output feed-back type circuit.

In FIG. 2a, the parallel type absolute value computing circuit 10 is composed of two subtractors connected in parallel with each other, and a selector 13.

The subtractors 11 and 12 calculate differences between two input signals Sin1 and Sin2, that is (Sin1−Sin2) and (Sin2−Sin1), respectively. The selector 13 selects and outputs a positive result of the calculation. In this arrangement, for example, the subtractor 11 outputs the most significant bit denoted hereinbelow as "MSB") or the sign digit bit as a control input signal Sc to control the selector 13.

The series type absolute value arithmetic circuit 20 shown in FIG. 2b is composed of a subtractor 21, a sign inverter 22 connected in series to the subtractor 21 and a selector 23. The sign inverter 22 is composed of a 2's complement circuit including an inverting circuit and an adder.

In this absolute value arithmetic circuit 20, the subtractor 21 calculates a difference between two input signals Sin1 and Sin2, that is, (Sin1−Sin2). In accordance with a resultant signal of the computation, if the value is positive the selector 23 outputs the value as it is, but if the value is negative, it selects and delivers an output from the sign inverter 22 by which the value is inverted and is subjected to 2's complement computation by addition. In this arrangement, for example, the subtractor 21 outputs the MSB which is used as a control input signal Sc to the selector 23.

In FIG. 2c, the input register type absolute value arithmetic circuit 30 shown in FIG. 2c, is composed of registers 31 and 32, a selector 33, and a subtractor 34.

In this absolute value arithmetic circuit 30, two input signals Sin1 and Sin2 are stored in the registers 31 and 32, respectively, and the subtractor 34 calculates a difference between the two input signals Sin1 and Sin2, that is, (Sin1−Sin2). If the result of the calculation is a positive value, the selector 33 outputs the value as it is. However, if it is negative, the selector 33 exchanges the signals stored in the registers 31 and 32. The subtractor 34 again subtracts the thus replaced signals and delivers the result of the subtraction during the next clock cycle. In this arrangement, for example, the MSB of an output from the subtractor 34 is used as a control input signal Sc to the selector 33.

The output feed-back type absolute value arithmetic circuit 40, as shown in FIG. 2d, is composed of a subtractor 41, a register 42, and a selector 43.

In this absolute value computing circuit 40, the subtractor 41 calculates a difference between two input signals Sin1 and Sin2, that is, (Sin1−Sin2), and if the difference is positive, the value thereof is once stored in the register 42 and is then delivered as it is. But if it is negative, the value stored in the register 42 is selected by the selector 43 in accordance with a control input signal Sc, and then the sign thereof is inverted by the subtractor 41, then the thus obtained value being outputted.

In the conventional absolute value arithmetic circuits 10, 20, 30, and 40, when two input signals Sin1 and Sin2 are inputted, the absolute value of a difference between the two signals Sin1 and Sin2, that is, |sin1−sin2| is calculated.

However, the conventional absolute value arithmetic circuits 10, 20, 30 and 40 have the following problems:

The parallel-type absolute value arithmetic circuit 10 can compute in short time, or one clock cycle, but requires two computing units 11, 12, thus leading to complicated hardware.

The series type absolute value arithmetic circuit 20 has advantages in view of the scale of the hardware in comparison with that of the absolute value arithmetic circuit 10. However, the process of addition for 2's complement calculation carried out by the sign inverter 22 causes longer computation time. The computation time is substantially twice as long as that of the absolute value computing circuit 10.

With the input register type absolute value arithmetic circuit 30, the scale of the hardware is smaller than that of the absolute value arithmetic circuits 10, 20. However, the computation time requires two clock cycles.

With the output feed-back type absolute value arithmetic circuit 40, the scale of the hardware can be relatively small. However two clock cycles is required for computation.

In the conventional absolute value arithmetic circuits, it has been difficult to miniaturize its circuit size and to satisfy high speed computation.

BRIEF SUMMARY OF THE INVENTION

The present invention is devised in view of the above-mentioned problems which are inherent to the conventional arrangements. Accordingly, one object of the present invention is to provide a miniaturized high-speed absolute value arithmetic circuit.

According to the present invention, an absolute value arithmetic circuit for computing the absolute value of a difference between two binary input signals comprises a computing circuit for obtaining a difference between the two input signals; a 1's complementor for non-inverting or inverting an output from the computing element in accordance with a positive or negative sign designated by a sign digit bit of the output from the computing element; a priority encoder for searching an output from the 1's complementor for a position of a first "0" bit from the least significant digit, and delivering an encoder output giving an information of the position of the "0" bit; and a bit inverting circuit for inverting and delivering a bit row from the least significant digit bit to the "0" bit in the output from the 1's complementor in accordance with the encoder output, and directly delivering a bit row from a bit higher than the "0" bit by one digit to the most significant digit bit of the output without inverting them.

According to the absolute value arithmetic circuit of the present invention, the computing circuit obtains a difference between two binary input signals, and the 1's complementor converts the difference between two binary input signals into a 1's complement which is obtained by the computing element. The circuit uses the sign digit bit (for example, the most significant bit) of the difference between the two binary input signals when the difference is negative, but delivers the value of the difference as it is when the difference is positive.

The priority encoder searches the output of the 1's complementor for the position of the first bit which is "0" bit, starting from the least significant bit (LSB), and delivers an encoder output which is a data indicating the position of this first "0" bit, (bit position output).

The bit inverting circuit receives an output from the 1's complementor and an encoder output from the priority encoder, and acts upon the output from the 1's complementor to invert the bit pattern on the least significant bit side (LSB side) including the "0" bit indicated by the encoder output when the difference between the two binary input signals obtained by the computing circuit is negative.

With this arrangement, the above-mentioned purpose of the present invention can be achieved.

The further scope and applicability of the present invention will become apparent from the detailed description and specific example, while indicated preferred embodiments of the invention are given by way of illustration only, since various changes and modifications within the spirit and scope of the invention will become apparent to those skilled in the art from this detailed description.

BRIEF DESCRIPTION OF THE DRAWINGS

These and other features and advantages of the invention may be more completely understood from the following detailed description of the preferred embodiments of the invention with reference to the accompanying drawings in which:

FIG. 1 is a circuit diagram illustrating an absolute value arithmetic circuit in an embodiment of the present invention;

DETAILED DESCRIPTION OF THE PREFERRED EMBODIMENTS

Figure 2A:
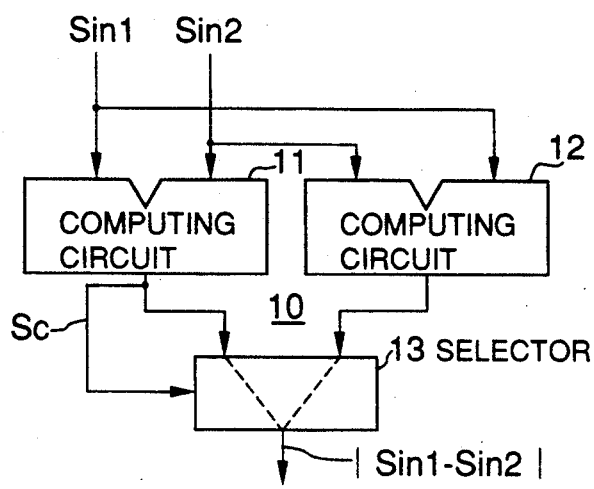
FIG. 2a is a conventional parallel-type absolute value.
Figure 2B:
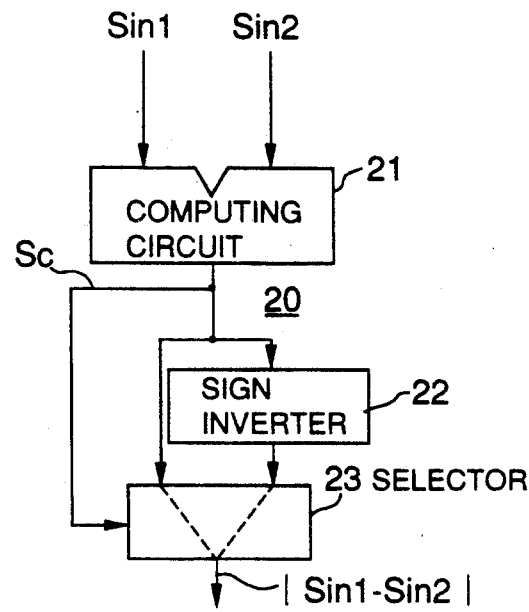
FIG. 2b is a conventional series-type absolute value arithmetic circuit.
Figure 2C:
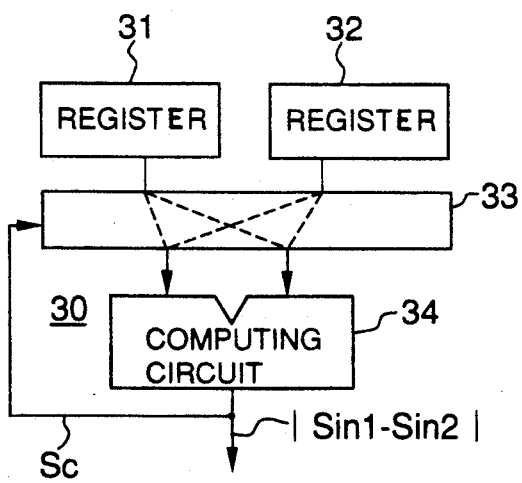
FIG. 2c is a conventional input register-type absolute value arithmetic circuit.
Figure 2D:
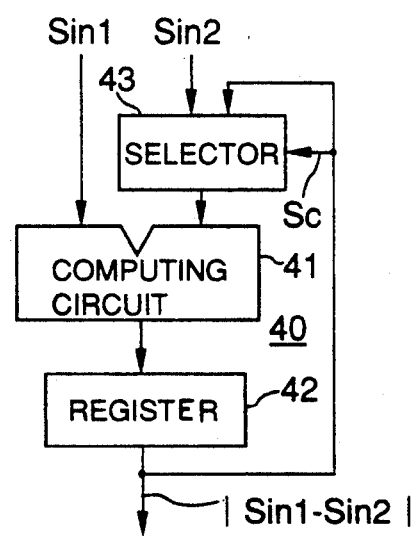
FIG. 2d is a conventional output feed-back type absolute value arithmetic circuit.

An absolute value arithmetic circuit in one embodiment of the present invention will be explained below with reference to FIG. 1.

The absolute arithmetic circuit 50 comprises a computing circuit 51, a 1's complementor 52, a priority encoder 53, and an LSB bit inverting circuit 54.

The computing circuit 51 performs subtraction (Sin11−Sin12) where Sin11 and Sin12 are binary data. The computing circuit 51 delivers a binary digit string Qs as a result of computation to the complementor 52. The most significant bit of the binary digit string Qs indicates a sign. For example, when the most significant bit is "0", Qs is a positive number, but if it is "1", Qs is a negative number which is indicated by a 2's complement.

Figure 3:
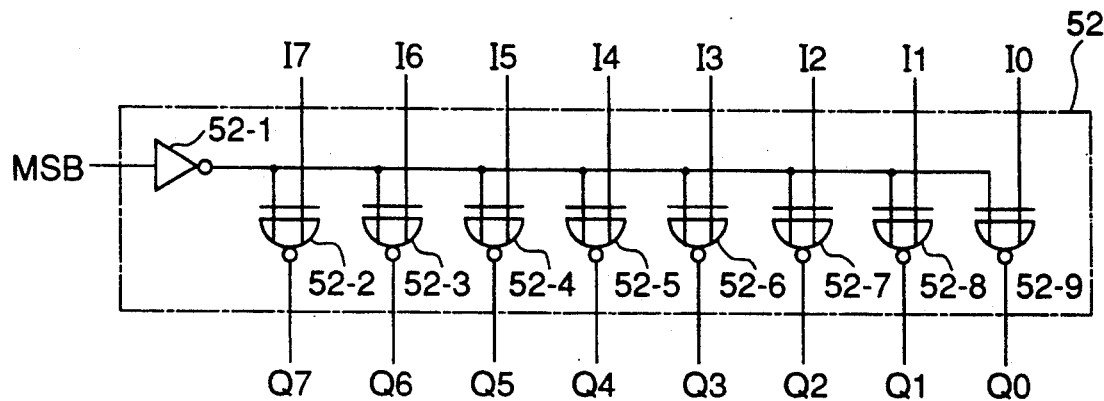
FIG. 3 is a circuit diagram illustrating a 1's complementor shown in FIG. 1.

The 1's complementor 52 delivers a binary digit string Qc which is equal to the inputted binary digit string Qs to the priority encoder 53 and the bit inverting circuit 54 when the most significant digit bit of the binary digit string is "0". When the most significant bit is "1", the 1's complementor 52 delivers a binary digit string Qc which is obtained by inverting all bits of the binary digit string Qs to the priority encoder 53 and the bit inverting circuit 54. In other words, the binary digit string Qc is the one which is obtained by converting the binary digit string Qs into a 1's complement. As shown in FIG. 3, the 1's complementor 52 requires an inverter 52-1 and exclusive NOR gates (denoted as Ex.NOR gate) 52-2 to 52-9 if the binary digit string Qs consists of 8 bits.

The priority encoder 53 searches the binary digit string Qc for the first bit which has a value of "0". The priority encoder 53 delivers a data Qe which exhibits the position of the least significant bit "0" of the bits which have been searched. For example, if the binary digit string Qc is "00011011", Qe becomes data indicating "3". The priority encoder 54 is composed of NAND gate, NOR gate and the like.

Figure 4:
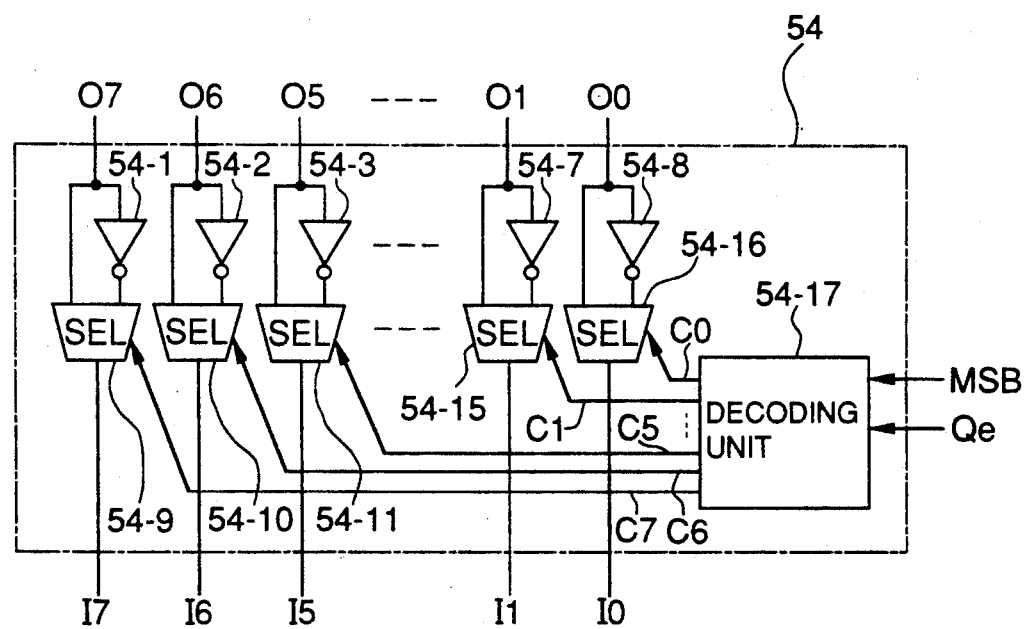
FIG. 4 is a circuit diagram illustrating an LSB bit inverting circuit shown in FIG. 1.

The bit inverting circuit 54 delivers a binary digit string which is equal to the inputted binary digit string Qc if the most significant bit of the binary digit string Qs is "0". If the most significant bit of the binary digit string Qs is "1", the bit inverting circuit 54 inverts only bits that are lower than the position of a bit of the binary digit string Qc, which is exhibited by the data Qe. The bit inverting circuit 54 delivers a binary digit string which is obtained by the inversion. For example, if the binary digit string Qc is "00011011" and Qe is "3", the bit inverting circuit 54 delivers "00011100". As shown in FIG. 4, if the binary digit string Qs consists of 8 bits, the bit inverting circuit 54 requires inverters 54-1 to 54-8, selecting circuit portions (denoted as "SELs") 54-9 to 54-16, and a decoding unit 54-17. The decoding unit 54-17 converts the data Qe into inversion control signals C7 to C0. The decoding unit 54-17 is composed of a ROM converter, a programmable logic array or the like. The inversion control signals C7 to C0 selectively control the SELs 54-9 to 54-16, respectively.

Next, the operation of a 8-bit absolute value arithmetic circuit will be described.

The computing circuit 51 carries out subtraction between two binary input data Sin11, Sin12. The computing circuit 51 delivers a binary digit string Qs which is a result of the subtraction, to the 1's complementor 52. The 1's complementor 52 delivers bits I7 to I0 of the binary digit string Qs to the Ex.NOR gates 52-2 to 52-9. The 1's complementor 52 delivers the most significant bit of the binary digit string Qs to the NOR gates 52-2 to 52-9 by way of the inverter 52-1. Accordingly, if the most significant bit is "0", Ex.NOR gates 52-1 to 52-9 delivers bits θ7 to θ0 which are equal to the bits I7 to I0 to priority encoder 53 and the bit inverting circuit 54. If the most significant bit is "1", the Ex.NOR gates 52-1 to 52-9 deliver bits θ7 to θ0 which are obtained by inverting bits I7 to I0 to the priority encoder 53 and the bit inverting circuit 54. Bits θ7 to θ0 will be denoted as the binary digit string Qc.

The priority encoder 53 searches bits θ7 to θ0 of the binary digit string Qc for those having a value "0". The priority encoder 53 delivers a data Qe which exhibits the position of the least significant bit among searched bits having a value of "0" to the bit inverting circuit 54. It is noted that the data Qe may be binary, that is, if it is "3", it may be exhibited by "11".

The bit inverting circuit 54 delivers the data Qe and the most significant bit of the binary digit string Qs to the decoding unit 54-17. If the most significant bit of Qs is a value "0", the decoding unit 54-17 ignores the data Qe. That is, the decoding portion 54-17 delivers the inversion control data C7 to C0 which does not invert bits θ7 to θ0, to the SELs 54-9 to 54-16. The SELs 54-9 to 54-16 set in accordance with the inversion control data C7 to C0 so that bits θ7 to θ0 are delivered as I7 to I0 without inversion through the inverters 54-1 to 54-8. Accordingly, the bit inverting circuit 54 delivers bits I7 to I0 which are equal to bits θ7 to θ0 of the binary digit string Qc. If the most significant bit of Qs is a value "1", the decoding portion 54-17 delivers to the SELs 54-9 to 54-16 the inversion control data C7 to C0 for inverting only those of bits θ7 to θ0 which are lower than the position of the bit exhibited by the data Qe. The SELs for the lower digit bits corresponding to those of the inversion control data C7 to C0 which are inversion data, set so that the inputted bits are inverted by the inverters. The upper digit bit SELs corresponding to those of the inversion control data C7 to C0 which are non-inversion data sets so that the inputted data are delivered without inversion through the inverters. Accordingly, the bit inverting circuit 54 inverts those of bits θ7 to θ0 of the binary digit string Qc that are lower than the position of the bit exhibited by the data Qe but does not invert the other bits, and accordingly, delivers I7 to I0. For example, if the binary digit string Qe is "10011011" and the data Qc is "3", the output of the bit inverting circuit 54 becomes "10011100" which is similar to that obtained by adding "1" to the binary digit string Qc.

As mentioned above, if the result of the subtraction between two data Sin11, Sin12 is positive, the absolute value arithmetic circuit 50 directly delivers it as it is. However, the absolute value arithmetic circuit 50 carries out 2's complement conversion without using addition for the result of the subtraction if the result of the subtraction is negative. The absolute value arithmetic circuit 50 delivers the result of subtraction which is given by 2's complement conversion. In other words, this output becomes the absolute value |sin11−sin12|.

The embodiment offers the following advantages:

A single computing circuit 51 is used for the absolute value arithmetic circuit 50. The 1's complementor 52, the priority encoder 53 and the bit inverting circuit 54 are provided for computing the absolute value of the difference obtained by the computing element 51. In order to perform the absolute value computation, the 1's complementor 52 carries out 1's complement calculation, the priority encoder 53 carries out the "0" bit detection, and the bit inverting circuit 54 performs the inversion of bits lower than the "0" bit.

Accordingly, with the absolute value arithmetic circuit 50 in this embodiment, it is possible to reduce the scale of hardware and to shorten the computation time in comparison with the conventional absolute value arithmetic circuits 10, 20, 30, and 40.

It is noted here that the present invention should not be limited only to the above-mentioned embodiment, but various changes and modification can be made thereto.

For example, the absolute value arithmetic circuit 50 can be changed in the arrangement. The computing circuit 51 is a subtractor. In this case, the hardware arrangement of the absolute value arithmetic circuit 50 can be reduced more. Further, the computing element 51 also may include an arithmetic logic unit (ALU) or the like. Accordingly, its hardware arrangement can be also used for computation other than that for the absolute value.

Further, although the 1's complementor 52 and the bit inverting circuit 54 have been used for data having a 8 bit length, the number of component elements can be changed depending upon a length of data. The logic gates may be modified in other arrangements. Further, the logic level should not be limited to that stated in the above-mentioned embodiment.

As mentioned above, the absolute value arithmetic circuit according to the present invention includes a computing circuit, a 1's complementor, a priority encoder and a bit inverting circuit. The computing circuit can be restrained to only one. The complement calculation in the absolute value computation process can be made by a logic inversion process and a "0" bit detection without using an addition process.

Accordingly, it is possible to realize an absolute value arithmetic circuit which has a less hardware scale and a miniature size and which performs a high speed arithmetic operation.

What we claim is:

1. An absolute value arithmetic circuit for computing an absolute value of a difference between two binary input signals, comprising:
   a computing circuit for computing a difference between said two input signals and generating a first signal;
   a ones complementor for non-inverting or inverting said first signal from said computing circuit in accordance with a sign bit of said first signal to generate a second signal;
   a priority encoder coupled to receive said second signal for searching said second signal for the position of the first "0" bit from the least significant digit bit of said second signal and for delivering an encoder signal indicating the position of the first "0" bit; and
   a bit inverting circuit coupled to receive the second signal and the encoder signal for inverting and outputting bits from the least significant digit bit to said "0" bit position of the second signal in accordance with said encoder signal, and for outputting bits from a bit higher than said first "0" bit to the most significant digit bit of the second signal without inverting the bits.

2. An absolute value arithmetic circuit as set forth in claim 1 wherein said computing circuit is a subtractor.

3. An absolute value arithmetic circuit as set forth in claim 1 wherein said computing circuit is an arithmetic logic unit.

4. An absolute value arithmetic circuit for computing the difference between a first binary input signal and a second binary input signal, comprising:
- a calculating circuit for calculating the difference between the first binary input signal and second binary input signal and outputting a first, n-bit, binary output signal having first through n-th bits corresponding to the difference, wherein n is a natural number;
- a complementary circuit coupled to receive the first, n-bit binary output signal for outputting a second, n-bit, binary output signal, wherein said second, n-bit, binary output signal is the ones complement of the first, n-bit, binary output signal when the first bit of the first, n-bit, binary output signal is in a first state and for outputting a second, n-bit, binary output signal equal to the first, n-bit, binary output signal when the first bit is in a second state;
- an encoder coupled to receive the second, n-bit, binary output signal and to detect an i-th bit thereof for outputting a position signal indicating the position of the i-th bit, wherein the i-th bit is in the second state and the i+1th to n-th bits are in the first state, and wherein i is a natural number not greater than n; and
- an inverting circuit coupled to receive the second, n-bit, binary output signal and the position signal for providing the ones complement of the i-th bit to the n-th bit of the second, n-bit, binary output signal and for outputting a third, n-bit, binary signal, representing the absolute value of the difference between the first and second binary input signals.

5. An absolute value arithmetic circuit according to claim 4 wherein the first bit is the most significant bit (MSB) and the n-th bit is the least significant bit (LSB).

* * * * *